United States Patent
Suzuki

(10) Patent No.: US 6,732,608 B2
(45) Date of Patent: May 11, 2004

(54) SHIFT KNOB AND SHIFT LEVER

(75) Inventor: Takayoshi Suzuki, Battle Creek, MI (US)

(73) Assignee: Fujikiko Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/892,183

(22) Filed: Jun. 26, 2001

(65) Prior Publication Data

US 2002/0062709 A1 May 30, 2002

(30) Foreign Application Priority Data

Jun. 27, 2000 (JP) ..................... P2000-192773

(51) Int. Cl.⁷ .................... B60K 20/00; G05G 1/00
(52) U.S. Cl. .............. 74/473.3; 74/523; 74/529; 74/537
(58) Field of Search ............. 74/473.3, 473.23, 74/473.33, 523, 529, 537, 538; 192/3.62

(56) References Cited

U.S. PATENT DOCUMENTS

| | | | | |
|---|---|---|---|---|
| 3,998,109 A | * | 12/1976 | O'Brien | 74/473.23 |
| 4,774,850 A | * | 10/1988 | Shovlin | 74/110 |
| 4,795,296 A | * | 1/1989 | Jau | 244/223 |
| 5,458,017 A | * | 10/1995 | Kanematsu et al. | 74/473.23 |
| 5,596,894 A | * | 1/1997 | Lee | 70/181 |
| 5,617,760 A | * | 4/1997 | Woeste et al. | 188/290 |
| 5,736,700 A | * | 4/1998 | Takahashi et al. | 200/4 |
| 6,131,425 A | * | 10/2000 | Li | 70/201 |
| 6,189,398 B1 | * | 2/2001 | Kataumi et al. | 74/423 |
| 6,298,743 B1 | * | 10/2001 | Horn et al. | 74/473.3 |
| 6,435,052 B1 | * | 8/2002 | Ersoy et al. | 74/473.1 |

FOREIGN PATENT DOCUMENTS

| | | | | |
|---|---|---|---|---|
| DE | 19513809 C1 | * | 10/1996 | F16H/59/10 |
| DE | 19941795 C1 | * | 1/2001 | B60K/20/02 |
| EP | 0 459 485 A | | 12/1991 | |
| EP | 0 655 570 A | | 5/1995 | |
| EP | 0 703 520 A | | 3/1996 | |
| JP | 57-166220 | | 10/1982 | |
| JP | 3-7641 A | | 8/1991 | |
| JP | 5-215205 A | | 8/1993 | |
| JP | 9-183315 A | | 7/1997 | |
| JP | 11151944 A | * | 6/1999 | B60K/20/02 |
| JP | 2000108706 A | * | 4/2000 | B60K/20/02 |
| WO | WO 1959 A2 | * | 1/2000 | |

* cited by examiner

*Primary Examiner*—David A. Bucci
*Assistant Examiner*—Julie K. Smith
(74) *Attorney, Agent, or Firm*—Brenda O. Holmes; Kilpatrick Stockton LLP

(57) ABSTRACT

A lever (60) is for operation via a grip (40). Lever (60) has a transmission member (61) incorporated therein. A mechanism (M1) is for the operation of transmission member (61) via grip (40). A connecting member (10) is assembled with mechanism (M1). Connecting member (10) is fixed to lever (60), having transmission member (61) incorporated therein. Connecting member (10) is mounted to grip (40).

9 Claims, 5 Drawing Sheets

SHIFT KNOB AND SHIFT LEVER

BACKGROUND OF THE INVENTION

1. Field of the Invention

The invention relates to a shift knob and a shift lever, which are adapted to a vehicle.

2. Description of Relevant Art

A shift lever, as a component of a transmission system for operation of transmission function of a vehicle, has at its upper end a shift knob for the driver to grip when driving. The shift knob is provided with a knob button for push-in operation in a shift operation. The grip of shift knob is made of a resin, a leather, aluminum or a wood, which improves its appearance and touch quality. Conventionally, response to client needs causes the production of a plurality of kinds of vehicles, which are assembled with shift knobs whose grips are made of different kinds of materials respectively.

The conventional mechanism of knob button, however, is mounted to the grip of shift knob for direct push-in operation. Thus, the mounting operation of shift knob is troublesome. In addition, if the surface material of grip is changed, exchange of the whole shift knob incurs high cost.

SUMMARY OF THE INVENTION

An object of the present invention is to provide a shift lever which facilitates the exchange of a grip as a constituent component of a shift knob and a shift lever.

To achieve the object, a first aspect of the invention provides the following shift knob. The knob includes a grip. A mechanism is for transmission operation via the grip. A connecting member is assembled with the mechanism. The connecting member is mounted to the grip.

A second aspect of the invention provides the following shift lever. The shift lever includes a grip. A lever is for operation with the grip. The lever has a transmission member incorporated therein. A mechanism is for operating the transmission member via the grip. A connecting member is assembled with the mechanism. The connecting member is fixed to the lever. The connecting member has the transmission member incorporated therein. The connecting member is mounted to the grip.

Preferably, the grip defines a first opening on a side thereof, and the connecting member is inserted in the first opening.

Preferably, the grip has a mounting means for mounting the connecting member within the first opening.

Preferably, the grip includes a second opening in communication with the first opening through the grip.

Preferably, the mechanism includes a button pivotable on the connecting member. The button projects from the first opening. The button and the first opening define a space therebetween.

Preferably, the shift lever further includes a cover for covering the space between the button and the first opening.

Preferably, the mechanism includes a first rotation member for pivotal motion on the connecting member; a second rotation member to be pushed by the first rotation member for pivotal motion on the connecting member and to be brought into contact with the transmission member; and a biasing member for biasing against the first rotation member.

Preferably, the connecting member supports the first rotation and the second rotation members. The biasing member is located between the connecting member and the first rotation member.

Preferably, the connecting member is fixed in the first opening, using the space.

A third aspect of the invention provides the following assembly method of a shift lever. A mechanism is assembled to a connecting member. The connecting member is inserted in a second opening of a grip via a first opening of the grip. The connecting member is mounted to the grip.

Preferably, the assembly method further includes fixing a lever to the connecting member.

According to the aspects, the mechanism is assembled to the connecting member first, the connecting member is then mounted to the grip, thus facilitating the exchange operation of the grip. As an option sale at an automobile dealer, the exchange of the knob can be performed. The necessity to exchange only the grip of the shift lever mechanism reduces cost considerably.

The first opening facilitates the insertion and mounting of the connecting member assembled with the mechanism, thus facilitating the grip exchange operation.

The mounting means for mounting the connecting member is simplified, so that the grip is easily made of aluminum or a wood in addition to a resin.

The use of the space allows the connecting member to be fixed to the mounting means in the first opening, thus facilitating the exchange operation of the grip.

The cover prevents foreign substances from entering into the grip or the connecting member, while the concealment of the fixing parts from view improves the appearance for beautification purposes.

The constitution of the mechanism with the first and the second rotation member and the biasing means reduces a number of components, and facilitates the assembly to the connecting member, thus improving the assemble ability and reducing the manufacturing cost.

BRIEF DESCRIPTION OF THE ACCOMPANYING DRAWINGS

These and other features, aspects, and advantage of the present invention will be better understood upon reference to the following description, appended claims, and the accompanying drawings where:

DETAILED DESCRIPTION OF THE PREFERRED EMBODIMENTS

Figure 1:
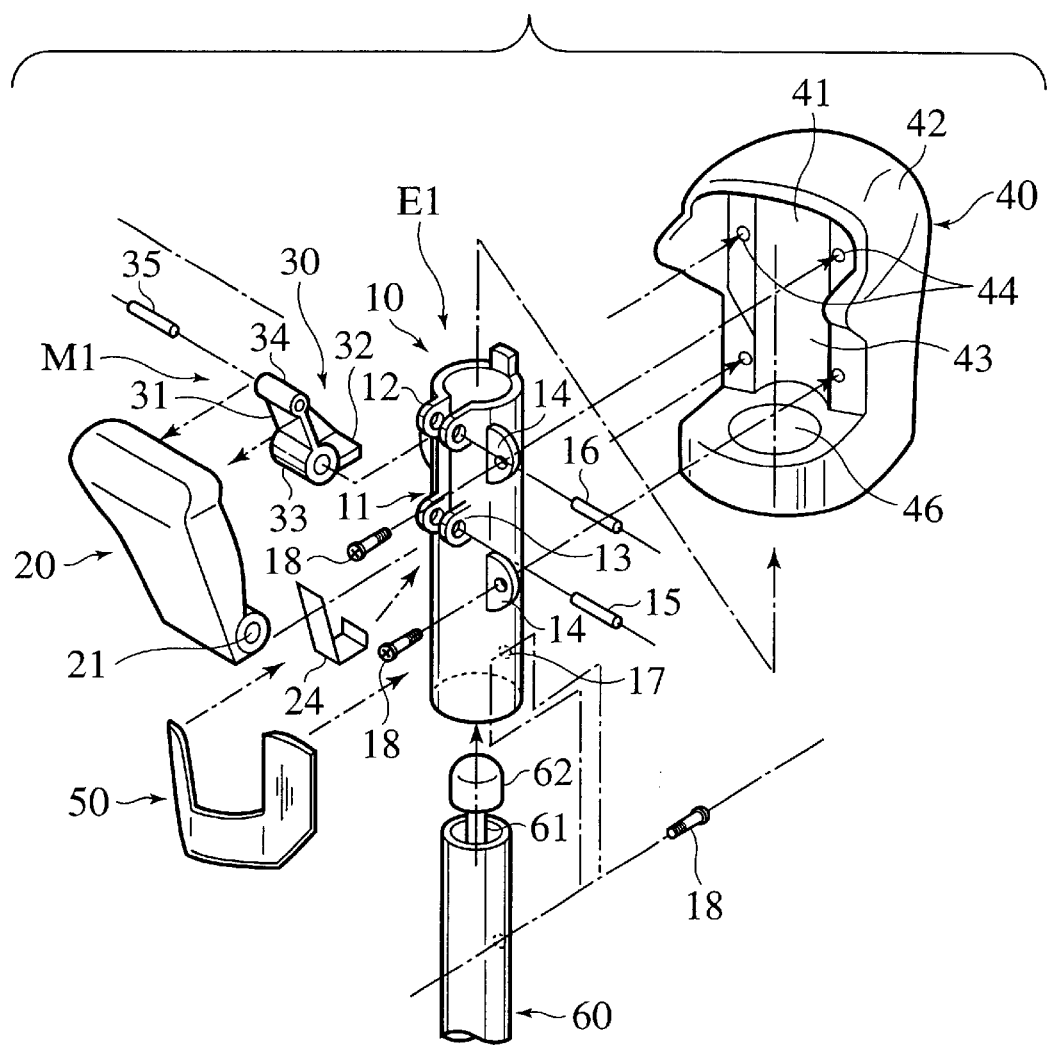
FIG. 1 is an exploded perspective view of a first embodiment according to the invention.

Embodiments of the invention will be explained with reference to drawings. Identical constitutions of the first and second embodiments of the invention are attached with the same reference characters for explanation.

First Embodiment

FIG. 1 shows the structure of shift knob E1 of the shift lever of a transmission system according to the first embodiment of the invention. The shift knob is mounted to the upper end of the shift lever to operate the transmission mechanism of a vehicle. The shift knob has a knob button 20; a base 10 assembled to a mechanism M1 of a conversion means 30 which is worked by operation of knob button 20;

a grip 40 removably mounted to base 10; and a cover 50 removably mounted to grip 40 to cover a gap between grip 40 and knob button 20. The shift knob E1, though base 10, is attached to a shift lever 60. The operation of knob button 20 works through the conversion means 30, as a link lever in the embodiment, a compression rod 61 as a transmission member located slidably in a shift lever 60.

In additional explanation of this structure, the base 10 is configured in tube to allow shift lever 60 to be inserted therein. From the upper to intermediate at the front, the shift lever has an assembly part 11 to allow the assembly of mechanism M1, including a link lever 30. Assembly part 11 has opposed shaft mounting parts 12 on both the left and right of the upper portion thereof, to allow the rotatable mounting link lever 30 by means of a pin 16. Assembly part 11 has opposed shaft mounting parts provided on both the sides of the lower portion thereof, to allow the rotatable mounting of the base of knob button 20 by a pin 15. Projecting from the both the left and right sides of base 10 are mounting parts 14 for the removable mounting of the base 10 to grip 40.

Knob button 20 has shaft support holes 21 on both the left and right sides of its base. Between the left and right support holes 21, the left and right mounting parts 13 of base 10 are interposed, being mounted by pin 15. Between left and right mounting parts 13 and the base of knob button 20, a leaf spring 24 as a biasing means 24 is to bias outwards the upper portion of knob button 20. A shaft support 22 projects from the inner face of the upper portion of knob button 20, which supports the upper arm 31 of link lever 30, or conversion means, by pin 35.

Figure 4:
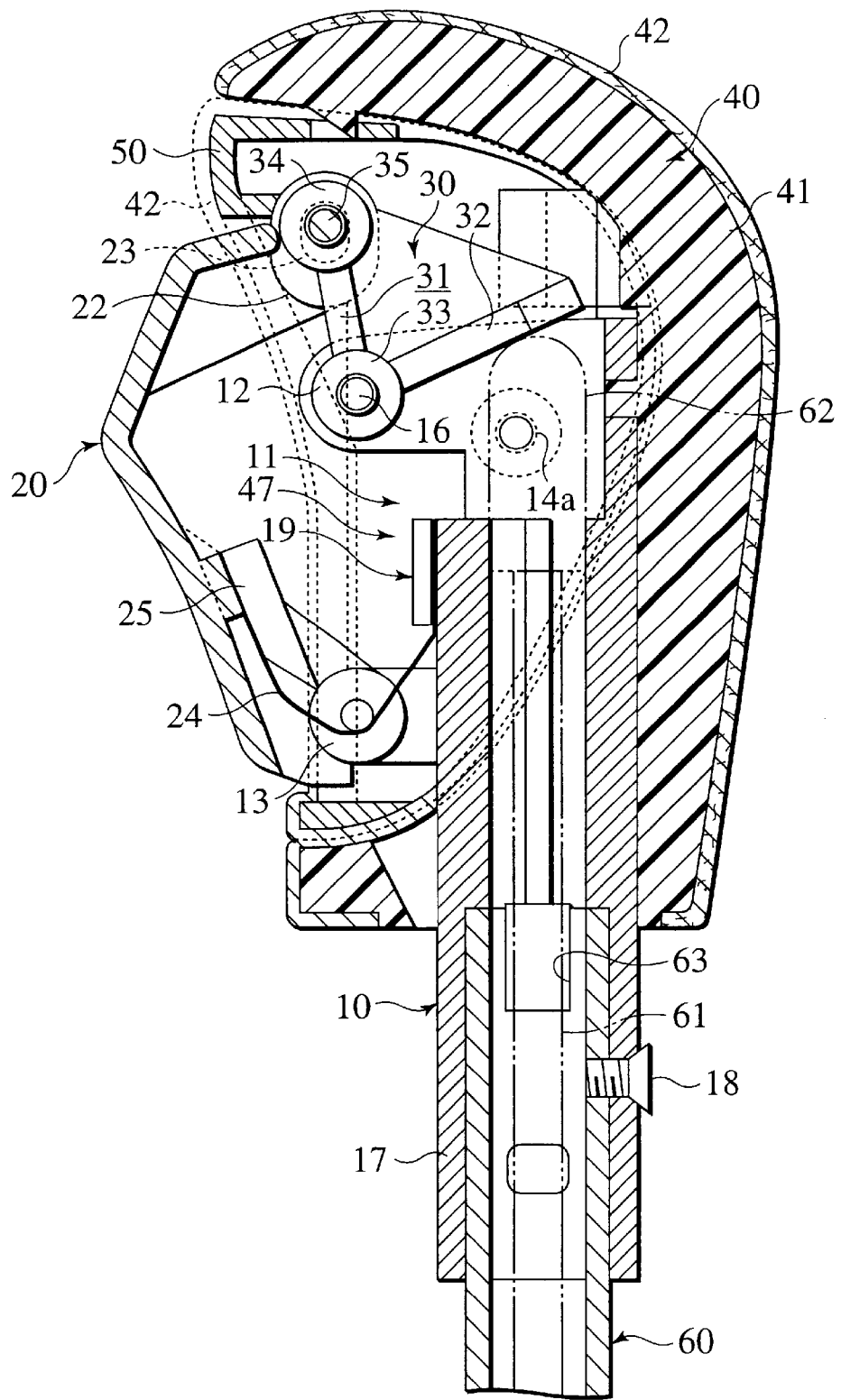
FIG. 4 is a sectional side view of the above.

The shaft support 22 is formed in an elongated hole in the second embodiment as will be detailed later. When the operation of knob button 20 causes the rotation of link lever 30 about shaft support 33 (mounted to the shaft support 12 of base 10), pin 35, which is inserted in the shaft support 34 of an upper arm 31, moves in a shaft support hole 23 as indicated in FIG. 4.

Link lever 30 has an upper arm 31 and an operation arm 32 joined with each other, which are configured in L-shape. The crossing part has shaft support 33, which is interposed between the left and right shaft mounting parts 12 of base 10 and mounted by pin 16. Upper arm 31 has at its outer end an shaft support 34 connected by pin 35 with an elongated hole formed to the shaft support of knob button 20. The bottom face of operation arm 32 is to be brought in contact with a head 62 of compression rod 61. The operation of knob button 20 causes the smooth operation of compression rod 61 by means of link lever 30.

Grip 40 is constituted with a grip body 41, and a surface cover 42 covering the outer surface of grip body 41 (alternatively, it may be constituted with only a grip body 41). The front side faces of grip body 41 are largely made open. The opening 43 allows base 10 assembled with a mechanism M1 such as knob button 20 and link lever 30 to be inserted therein, thus achieving removable mounting.

Due to the mounting of base 10, the first embodiment, as shown in FIG. 1, has a plurality of mounting parts 44 as a mounting means provided directly to the inner face of the rear of grip body 41. Mounting parts 44 each define a threaded hole, which is fastened with a screw 18 as a fastening means through a hole formed to mounting part 14 of base 10. The lower part of grip body 41 defines a lower opening 46 which communicates with opening 43. An insertion part 17 in the lower portion of base 10 is, in turn, inserted into lower opening 46 via opening 43.

A screw 18 fastens insertion part 17 of base 10 to the upper end of shift lever 60, being screwed into the threaded hole of shift lever 60 through the hole of insertion part 17.

Second Embodiment

Next, a shift knob structure of the shift lever of a transmission system according to the second embodiment will be explained. Any constitutions identical to that of the first embodiment are given the same character, and their explanation is omitted.

Figure 2:
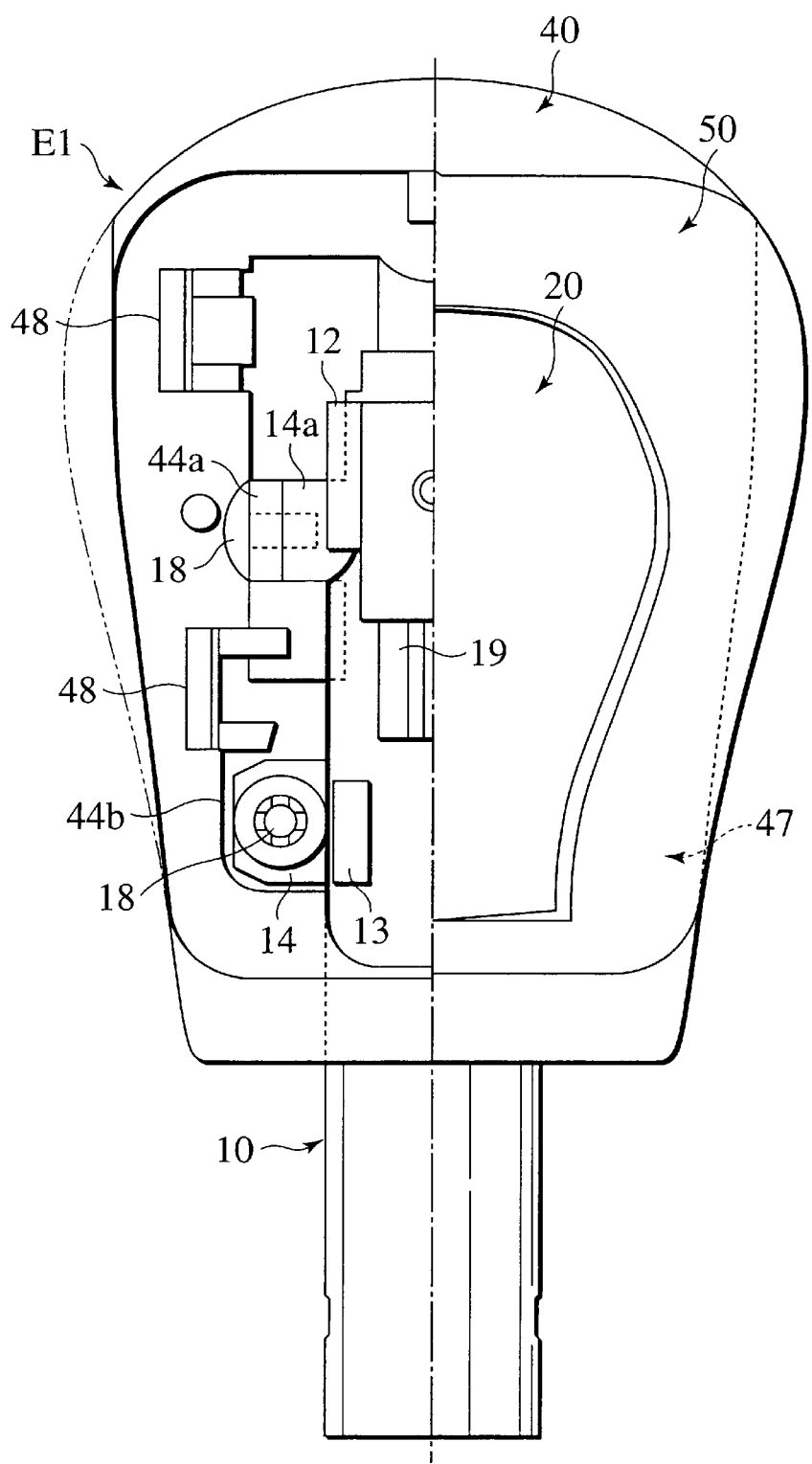
FIG. 2 is a partially cut front view showing a second embodiment.
Figure 3:
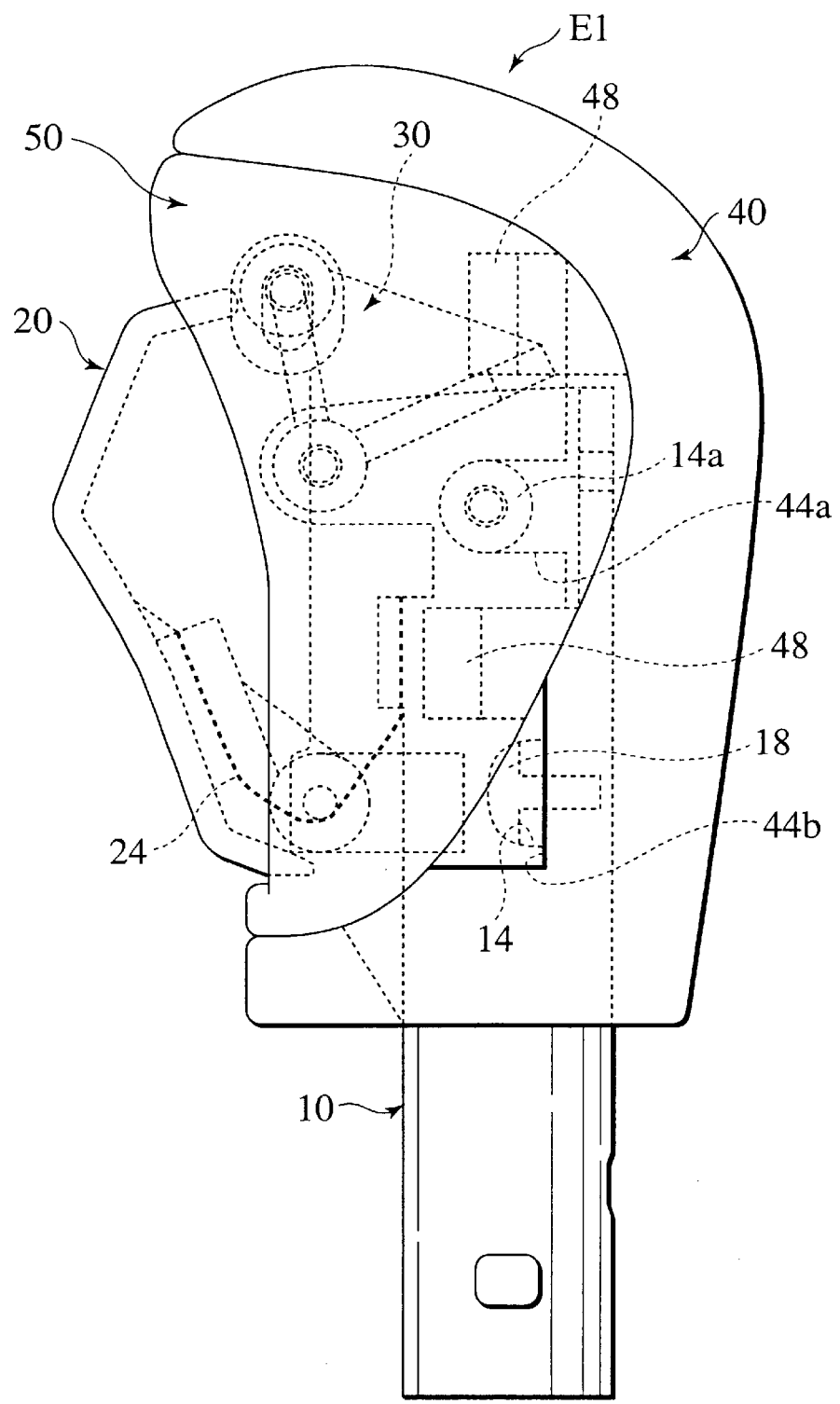
FIG. 3 is a side view of the above.

In the embodiment, the front and part of both side faces of grip 40, as shown in FIG. 2, are made largely open. Opening 43 has mounting parts 44 fixed separately therein for the attachment of base 10. Mounting parts 44 each include a cover locking part 48 for the locking of cover 50; and an upper mounting part 44a and lower mounting part 44b for mounting base 10. Upper mounting part 44a is formed with mounting holes facing sideways, for base 10 to be screwed to grip body 41 from both the sides by screws 18 as a fastening means. In accordance with this, an upper mounting part 14a also faces sideways.

Figure 5:
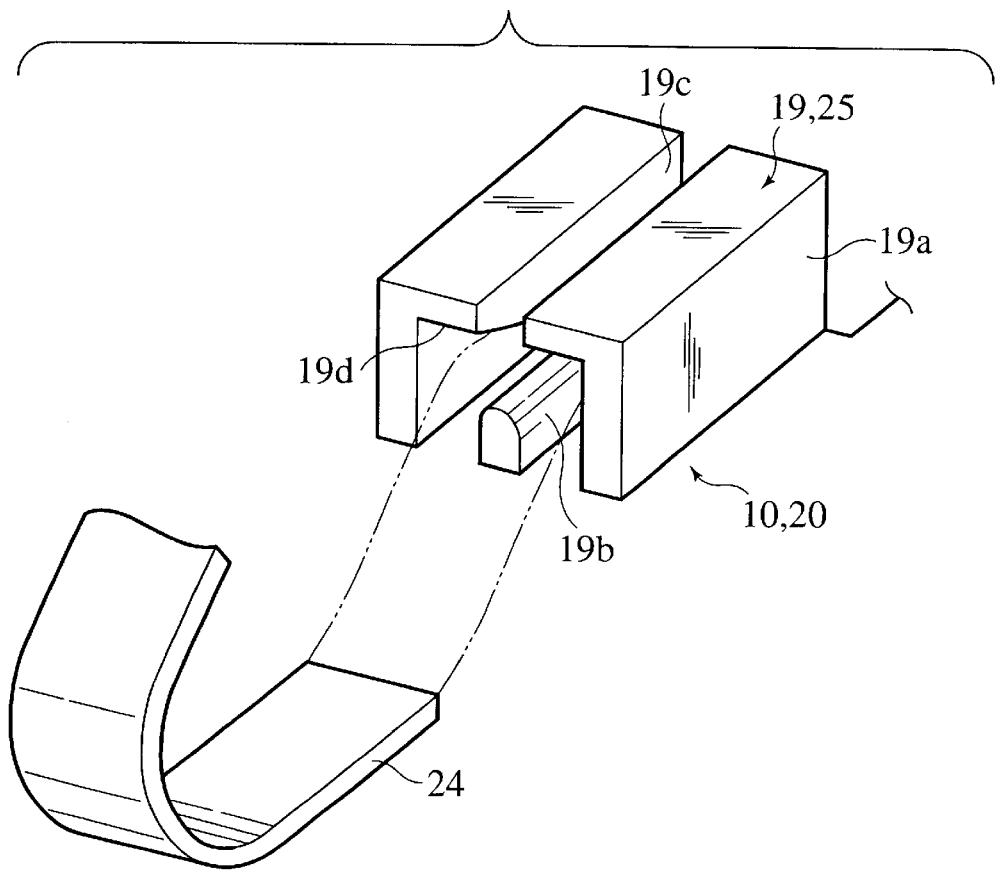
FIG. 5 is an exploded perspective explanation view showing the structure of a spring holding part at a base according to the above.
Figure 6:
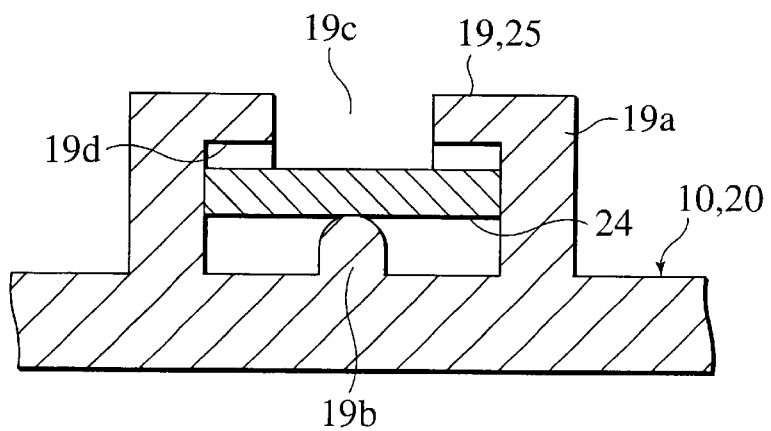
FIG. 6 is a sectional explanation view showing the structure of a spring holding part at a knob button according to the above.

The ends of leaf spring 24 as a biasing means are mounted to a spring holding part 19 in base 10 as shown in FIGS. 5 and 6 and a spring holding part 25 at knob button 20, allowing the top of knob button 20 to be biased outwards.

As specifically explained, spring holding part 19 in base 10, as shown in FIGS. 5 and 6, includes a pair of L-shaped spring locking parts 19a which project from the outer face of base 10 extend along the axis of the base; a projection 19b which projects from the bottom face of the space between spring locking parts 19a i.e. the surface of base 10 and extends along the axis of the base; bent parts 19d which extend along insertion inner faces of locking parts 19a respectively. Spring holding part 25 of knob button 20 has an identical structure. Leaf spring 24 is mounted spring holding part 19 of base 10 and to spring holding part 25 of the knob button by gentle pushing, thus allowing the upper portion of knob button 20 to be biased outwards.

In this embodiment, grip body 41 of grip 40 is formed by a frame being molded from a hard synthetic resin beforehand and the frame as a core then being insert molded using a soft synthetic resin. Thus, grip 40 becomes soft to touch, improving the drive experience. The outer surface of produced grip body 41 further has a leather surface cover 42, which completes grip 40.

In FIG. 4, a cut 63 in the upper end of shift lever 60 is employed for positioning and prevention of rotation of the knob upon insertion. Base 10 has a projection that engages with cut 63 in its insertion part 17.

In this embodiment, cover locking part 48 and mounting part 44 with upper and lower mounting parts 44a and 44b, being separately formed, are fixed within grip 40. In the cases where grip 40 is molded from a material with good formability such as a synthetic resin, the integral formation of these is preferable. However, in cases where molding from a material with a high molding cost such as aluminum or a wood occurs, the separate formation of cover locking part 48 and mounting part 44 are preferable to reduce in production costs.

Next, the embodiment that employs a rotation type of knob button will be explained. In addition, a sliding type of a knob button is also preferable embodiment.

As described above, knob button 20, biasing means 24 for biasing knob button 20 to project outwardly from opening 43 of grip 40, and conversion means 30 for converting the pushing operation of knob button 20 into the axial movement of the compression rod constitute mechanism M1 that is attached to assembly part 11 of base 10, the structure of which improves the mechanism M1 in assembly operability.

Knob button 20 located projecting from opening 43 of grip 40 and the inner surface of opening 43 define a space 47 therebetween. Within space 47, a fastening means of screw 18 of the embodiment fastens mounting part 14 of base 10 to the mounting means of grip body 41 in opening 43. Thereby, assembly ability and exchange operation of grip 40 are improved.

The location of knob button 20 projecting from opening 43 of grip 40 and provided with cover 50 to cover space 47 between knob button 20 and opening 43 of grip 40 reliably prevent any extraneous material from invading grip 40 or base 10 assembled with mechanism M1, and, on the other hand, keep the assembled parts from being visible from the outside, thus improving and beautifying the appearance.

In addition, composing grip body 41 of only a mounting part 44 for mounting base 10 and a cover locking part 48 simplifies its structure. Thus, manufacture is facilitated even when Aluminum or a wood in addition to a resin are used.

The independent and separate constitution of mounting part 44 for the mounting of base 10 further simplifies the structure of grip body 41, thus being preferable for the manufacturing process when using aluminum or wood.

The entire content of Japanese Patent Applications P2000-192773 (filed on Jun. 27, 2000) is incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A shift lever comprising:
    a first lever including a transmission operating member displaceable therein;
    a knob for operating the first lever,
    the knob comprising:
        a grip on the first lever,
        the grip comprising:
            a first opening and a second opening in communication with each other; and
            a mounting means; and
        an operating mechanism for operating the transmission operating member;
        the operating mechanism comprising:
            an input button rotatable relative to the grip; and
            a second lever rotatable by the input button to displace the transmission operating member; and
        a connecting member interconnecting the operating mechanism, grip and the first lever,
    the connecting member comprising:
        a tubular part mounted to the first lever, with the transmission operating member inserted in the tubular part, the tubular part being inserted into the first opening of the grip downwardly through the second opening, the tubular part being removably fixed to the grip by the mounting means, and being fixed to the first lever;
        a first supporting part rotatably supporting the input button; and
        a second supporting part rotatably supporting the second lever.

2. A shift lever according to claim 1,
    wherein the first opening is defined on a side of the grip, and the connecting member mounted with the operating mechanism is inserted in the first opening for mounting.

3. A shift lever according to claim 2,
    wherein the mounting means is within the first opening.

4. A shift lever according to claim 1,
    wherein the input button projects from the first opening, and the input button and the first opening define a space therebetween.

5. A shift lever according to claim 4, further comprising:
    a cover for covering the space between the input button and the first opening.

6. A shift lever according to claim 1,
    wherein the operating mechanism comprises:
        a resilient member for pushing against the input button.

7. A shift lever according to claim 6,
    wherein the resilient member is located between the connecting member and the input button.

8. A shift lever according to claim 4,
    wherein the connecting member is fixed in the first opening, using the space.

9. A shift lever according to claim 1,
    wherein the tubular part has a hole therein, and the tubular part has the first lever inserted therein and the tubular part is fixed to the first lever.

* * * * *